(12) United States Patent
Kim et al.

(10) Patent No.: US 6,867,259 B2
(45) Date of Patent: Mar. 15, 2005

(54) BIMODAL BLOCK COPOLYMER, PROCESS FOR MANUFACTURING METHOD AND ITS USAGE

(75) Inventors: Jong-Geun Kim, Daejeon (KR); Sam-Min Kim, Daejeon (KR); Dai-Seung Choi, Daejeon (KR); Jong-Hyun Park, Daejeon (KR)

(73) Assignee: Korea Kumho Petrochemical Co., Ltd. (KR)

( * ) Notice: Subject to any disclaimer, the term of this patent is extended or adjusted under 35 U.S.C. 154(b) by 0 days.

(21) Appl. No.: 10/379,852

(22) Filed: Mar. 5, 2003

(65) Prior Publication Data

US 2003/0216511 A1 Nov. 20, 2003

(30) Foreign Application Priority Data

May 15, 2002 (KR) ........................................ 2002-26691

(51) Int. Cl.$^7$ .............................................. C08L 53/02
(52) U.S. Cl. ............................ 525/89; 525/98; 525/316
(58) Field of Search ............................ 525/89, 98, 316

(56) References Cited

U.S. PATENT DOCUMENTS 5,227,419 A * 7/1993 Moczygemba et al. ..... 524/128

FOREIGN PATENT DOCUMENTS

EP 242614 10/1987
GB 1436812 5/1976

OTHER PUBLICATIONS

U.S. Appl. No. 10/379,985, filed Mar. 2003, Kim et al.*

* cited by examiner

Primary Examiner—James J. Seidleck
Assistant Examiner—Olga Asinovsky
(74) Attorney, Agent, or Firm—Dilworth & Barrese LLP

(57) ABSTRACT

The present invention relates to a bimodal linear block copolymer containing a tapered block and its manufacturing method. The bimodal linear block copolymer includes a hexa-block copolymer of vinyl aromatic block(PS1)-conjugated diene block(PB1)-tapered block(T1)-vinyl aromatic block(PS2–PS3)-conjugated diene block(PB2)-vinyl aromatic block (PS4) as prepared by adding two charges of an initiator, and a tri-block copolymer of vinyl aromatic block(PS3)-conjugated diene block(PB2)-vinyl aromatic block (PS4). The bimodal linear block copolymer is prepared by adding more than one charge of the initiator, vinyl aromatic monomers and conjugated diene monomers to acquire transparency, toughness, rigidity and flexibility, and thereby can be used for sheets or films, or injection or blow molding products.

16 Claims, No Drawings

BIMODAL BLOCK COPOLYMER, PROCESS FOR MANUFACTURING METHOD AND ITS USAGE

BACKGROUND OF THE INVENTION

1. The Field of the Invention

The present invention relates to a transparent bimodal linear block copolymer and its manufacturing method and usage and, more particularly, to a transparent bimodal linear block copolymer and its manufacturing method and usage being characterized by adding two or more charges of an initiator and monomers during polymerization to form a block.

2. Related Prior Art

Generally, the preparation of multiblock copolymer resins from a vinyl aromatic monomer and a conjugated diene monomer involves adding two or more charges of the monomers and an initiator.

According to the prior art, a transparent tapered block copolymer is prepared by a method including the steps of (1) adding one charge of a vinyl aromatic monomer and n-butyl lithium; (2) adding one charge of a vinyl aromatic monomer and a conjugated diene monomer; and (3) adding one charge of a vinyl aromatic monomer (Ref GB 1436812). More specifically, the reaction in the step (2) of the polymerization process forms a copolymer having a tapered block between the polyconjugated diene block and the polyvinyl aromatic block. In this method, the monomodal copolymer having a tapered block to balance its mechanical properties is simple in preparation method but interior in general properties.

On the other hand, EP 242614 discloses a preparation method of block copolymers that includes the steps of (1) adding n-butyl lithium and a vinyl aromatic monomer; (2) further adding n-butyl lithium and a vinyl aromatic monomer; (3) adding a conjugated diene monomer; (4) further adding n-butyl lithium and a vinyl aromatic monomer; and (5) adding a conjugated diene monomer and a vinyl aromatic monomer.

In this method, the polymodal copolymer is prepared by adding three charges of the initiator and at least two charges of monomers to form one tapered block only at the end of the polymer chain.

SUMMARY OF THE INVENTION

Accordingly, the present invention is directed to a bimodal copolymer of high molecular weight and low molecular weight copolymers that are prepared by adding several charges of an anionic initiator, a vinyl aromatic monomer and a conjugated diene monomer, thereby overcoming the limitations of monomodal copolymers, and have one tapered block of the vinyl aromatic monomer and the conjugated diene monomer formed in the middle of the polymer chain of the high molecular weight copolymer rather than in the polymer chain of the low molecular weight copolymer, thereby enhancing toughness and flexibility.

It is therefore an object of the present invention to provide a transparent block copolymer that overcomes the problems with the monomodal copolymer of the limitations of the properties and the polymodal copolymer of the complexity of the preparation process, and allows the position or the number of the tapered blocks controllable to enhance the mechanical properties such as rigidity, flexibility and strength, while maintaining toughness, with workability enhanced.

It is another object of the present invention to provide a preparation method of the block copolymer that allows a simple control of the composition of high molecular weight and low molecular weight copolymers by changing the addition ratios of the initiator and the respective monomers and provides diversity of properties by changing the molecular weight and the content of the polyvinyl aromatic block.

It is further another object of the present invention to provide sheets or films, or injection or blow molding products obtained by using the above transparent copolymer of the present invention excellent in toughness, rigidity and flexibility.

To achieve the above objects of the present invention, there is provided a bimodal linear block copolymer that includes a hexa-block copolymer of vinyl aromatic block-conjugated diene block-tapered block-vinyl aromatic block-conjugated diene block-vinyl aromatic block, and a tri-block copolymer of vinyl aromatic block-conjugated diene block-vinyl aromatic block.

The bimodal linear block copolymer is prepared by a method that includes: (1) adding an initiator and a vinyl aromatic monomer to form a polyvinyl aromatic living polymer chain; (2) adding both a conjugated diene monomer and a vinyl aromatic monomer to the polyvinyl aromatic living polymer chain to form a living polymer chain of vinyl aromatic block-conjugated diene block-tapered block-vinyl aromatic block; (3) further adding an organic lithium initiator and a vinyl aromatic monomer to the living polymer chain to extend a vinyl aromatic block part of vinyl aromatic block-conjugated diene block-tapered block-vinyl aromatic block obtained in the step (2) and at the same time to form another new living polymer of vinyl aromatic block; (4) adding a conjugated diene monomer to the product of the step (3) to form a living polymer of vinyl aromatic block-conjugated diene block-tapered block-vinyl aromatic block-conjugated diene block and a living polymer of vinyl aromatic block-conjugated diene block; (5) adding a vinyl aromatic monomer to the product of the step (4) to form a living polymer of vinyl aromatic block-conjugated diene block-tapered block-vinyl aromatic block-conjugated diene block-vinyl aromatic block and a living polymer of vinyl aromatic block-conjugated diene block-vinyl aromatic block; and (6) adding a polymerization terminator to terminate polymerization and performing polymer isolation to prepare a bimodal linear block copolymer comprising a hexa-block copolymer of vinyl aromatic block-conjugated diene block-tapered block-vinyl aromatic block-conjugated diene block-vinyl aromatic block and a tri-block copolymer of vinyl aromatic block-conjugated diene block-vinyl aromatic block.

Now, the present invention will be described in detail as follows.

The term "PB" and "B" as used herein refer to a conjugated diene block and a conjugated diene monomer, the term "PS" and "S" a vinyl aromatic block and a vinyl aromatic monomer, the term "L" an initiator. The individual numeral represents the step of adding the corresponding monomer.

The product of the present invention is a bimodal copolymer of a hexa-block copolymer and a tri-block copolymer, the hexa-block copolymer including vinyl aromatic block (PS1)-conjugated diene block(PB1)-tapered block(T1)-vinyl aromatic block(PS2–PS3)-conjugated block(PB2)-vinyl aromatic block(PS4), the tri-block copolymer including vinyl aromatic block(PS3)-conjugated diene block (PB2)-vinyl aromatic block(PS4).

The copolymer of the present invention is prepared by adding several charges of monomers and two charges of an initiator according to the method that includes the following charge sequence:

(1) an initiator (L1) and a vinyl aromatic monomer (S1);

(2) a conjugated diene monomer (B1) and a vinyl aromatic monomer (S2);

(3) additional initiator (L2) and a vinyl aromatic monomer (S3);

(4) a conjugated diene monomer (B2); and (5) a vinyl aromatic monomer (S4).

In the respective steps, polymerization reaction is performed until the corresponding monomers are completely used up.

The copolymer products obtained by adding two charges of an organic lithium initiator in the steps (1) and (3) are bimodal and composed of two polymer species continuously grown from the steps (1) and (3).

More specifically, the step (1) forms a polyvinyl aromatic chain using the organic lithium initiator and grows the vinyl aromatic monomer to a living polymer chain (hereinafter, referred to as "S1-L") until the vinyl aromatic monomer is completely used up.

In the step (2), both a vinyl aromatic monomer and a conjugated diene monomer are added simultaneously. The two monomers are preferably added at the same time. But the conjugated diene monomer may be added temporarily earlier than the vinyl aromatic monomer. In this step, the conjugated diene monomer is polymerized prior to the vinyl aromatic monomer such that the vinyl aromatic monomer is gradually polymerized as the concentration of the conjugated diene monomer decreases. The reaction of the step (2) yields a "polyconjugated diene block" and a "polyvinyl aromatic block", with a "tapered block" formed between the polyconjugated diene block and the polyvinyl aromatic block. So the product of the step (2) is denoted by "S1-B1→S2-L", where the symbol "B1→S2" represents a polymer chain composed of a polyconjugated diene block, a tapered block and a polyvinyl aromatic block in sequence.

In the step (3), the organic lithium initiator and the vinyl aromatic monomer are additionally used to form another vinyl aromatic block, i.e., "S3-L", and the vinyl aromatic block "S1-B1→S2-L" of the step (2) is continuously grown into "S1-B1→S 2-S3-L". In this step, the organic lithium initiator is added prior to the vinyl aromatic monomer. The reaction of the step (3) that involves further adding the vinyl aromatic monomer results in a bimodal product including a high molecular weight copolymer "S1-B1→S2-S3-L" and a low molecular weight copolymer "S3-L".

In the steps (4) and (5), the conjugated diene monomer and the vinyl aromatic monomer are separately added to form "S1-B1→S2-S3-B2-S4-L" and "S3-B2-S4-L", respectively. According to this method, the molecular weights and the contents of PS1, PS2, PS3 and PS4 can be readily controlled by the added amounts of the monomers and the initiator, and the molecular weight ratio of PS2 to PS3 is controllable in the range of 10 to 0.1.

Namely, the polyvinyl aromatic blocks formed in the steps (2) and (3) can be controlled in size according to the added amounts of the vinyl aromatic monomer and the organic lithium initiator. The vinyl aromatic monomer added after the second charge of the initiator in the step (3) is grown from the end of the polymer formed in the step (2) and at the same time grown into another homo polyvinyl aromatic block by the initializing reaction of the organic lithium initiator.

The contents of the hexa-block copolymer and the tri-block copolymer finally produced, i.e., high molecular weight copolymer and low molecular weight copolymer can be freely controlled in the range of 30 to 90 wt. % and 70 to 10 wt. %, respectively, according to the addition ratios of the initiator and the monomers.

The polymer of the present invention preferably comprises, based on the total weight of the monomers added during polymerization, 55 to 95 wt. % of the vinyl aromatic monomer and 45 to 5 wt. % of the conjugated diene monomer, and more preferably, 70 to 80 wt. % of the vinyl aromatic monomer and 30 to 20 wt. % of the conjugated diene monomer.

The wide range and the preferred range for the method for preparing the block copolymer of the present invention can be summarized as follows:

TABLE 1

| Step | # | Ingredient (phm) | Wide range (phm) | Preferred range (phm) |
|---|---|---|---|---|
| 1 | (L and S) | L-1 | 0.013–0.192 | 0.023–0.096 |
|   |   | S-1 | 20–30 | 25–30 |
| 2 | (B and S) | B-1 | 2.5–15 | 5–10 |
|   |   | S-2 | 5–20 | 5–15 |
| 3 | (L and S) | L-2 | 0.001–0.075 | 0.001–0.064 |
|   |   | S-3 | 15–20 | 15–20 |
| 4 | (B) | B-2 | 2.5–30 | 15–20 |
| 5 | (S) | S-4 | 15–25 | 25–15 |
|   | Total | S | 55–95 | 70–80 |
|   |   | B | 45–5 | 30–20 |
|   |   | L | 0.014–0.267 | 0.024–0.160 |

In the above table, the symbol "(L and S)" represents the addition of the organic lithium initiator and the vinyl aromatic monomer, the symbol "(B)" the addition of the conjugated diene monomer, the symbol "(B and S)" the addition of the conjugated diene monomer and the vinyl aromatic monomer. For (L and S), the organic lithium initiator is added prior to the vinyl aromatic monomer. For (B and S), the vinyl aromatic monomer is added immediately after the conjugated diene monomer. The symbol "phm" represents the part by weight based on 100 parts by weight of all monomers.

In the method of preparing a block copolymer, the reaction temperature is in the range of −10 to 150° C., preferably 10 to 110° C. The reaction is performed with the pressure that the reaction mixture can be maintained in the liquid state.

The vinyl aromatic monomer as used in the preparation of the block copolymer according to the present invention may contain 8 to 12 carbon atoms and specifically include, for example, styrene, α-methylstyrene, o-methylstyrene, p-methylstyrene, or mixtures thereof. The most preferred vinyl aromatic monomer is styrene.

The conjugated diene monomer as used herein may contain 4 to 6 carbon atoms and specifically include, for example, 1,3-butadiene, 2-methyl-1,3-butadiene(i.e., isoprene), or mixtures thereof. The preferred conjugated diene monomer is 1,3-butadiene.

An inert hydrocarbon solvent for polymerization may be any solvent that can be used for anionic polymerization, and specifically include, for example, cyclohexane, cyclopentane, n-hexane, n-heptane, or mixtures thereof. The most preferred inert hydrocarbon solvent is cyclohexane.

A polar organic compound used as a randomizer for improving the effect of the organic lithium initiator and controlling the size of the tapered block and the contents of ingredients in the conjugated diene block by 1,2-addition reaction may be tetrahydrofuran, which can be added before or during the polymerization reaction. The tetrahydrofuran is preferably added in an amount of about 0.01 to 1.0 phm.

The organic lithium initiator may be any initiator commonly used for anionic polymerization and is preferably n-butyl lithium.

Preferably, the polymerization reaction is performed in the atmosphere removed of oxygen or water.

After the completion of the polymerization reaction, water, alcohol, phenol or active hydrogen compounds such as dicarboxylic acid are added to convert the carbon-lithium bond of the active polymer to a carbon-hydrogen bond and thereby isolate the polymer. The most preferred polymerization terminator is water and carbon dioxide. The polymerization product mixed with the polymerization terminator is treated with a stabilizer and then removed of the solvent with a vacuum oven or a devolatilizing extruder.

The stabilizer as used herein may include a mixture of hindered phenol and organophosphite.

The resinous polymer removed of the solvent is a material useful for molded products and sheet materials, and mixed with various additives such as a releasing agent prior to a processing step.

More specifically, the bimodal linear block copolymer of the present invention can be used in the preparation of a bubble pack, which refers to a molded transparent plastic or a flexible plastic sheet used for packing, carriage and display.

As described above, the method for preparing a bimodal linear block copolymer according to the present invention controls the molecular weights and contents of the vinyl aromatic blocks PS1, PS2, PS3 and PS4 by two charges of the initiator and more than one charge of the monomers, the composition of higher and lower copolymers by the addition ratio of the initiator and the monomers, thereby making different mechanical properties of the transparent copolymer resin such as strength and flexibility freely controllable.

DETAILED DESCRIPTION OF THE INVENTION

Hereinafter, the present invention will be described in detail by way of the following examples, which are not intended to limit the scope of the present invention.

EXAMPLES 1 AND 2

Styrene and 1,3-butadiene were copolymerized using n-butyl lithium as an initiator in five steps.

Polymerization was performed in a stainless steel reactor equipped with a 10L jacket in the nitrogen atmosphere. During the polymerization reaction, the anhydrous reaction mixture was continuously stirred. The polymerization terminator was water and carbon dioxide. A mixture of Irganox 1010 0.2 phm and tris(nonylphenyl)phosphite 0.4 phm was added to the copolymer product as a stabilizer, and the solvent was vaporized/removed using a vacuum oven or a devolatilizing extruder.

The solid polymer removed of the solvent was measured in regard to different properties.

Molecular weight information was determined using GPC (Gel Permeation Chromatography). For GPC, a Waters-2690 body (including pump, injector and column box), a Waters 410 Differential refractometer as a detector, and HR5E-HR4-HR4-HR2 (Waters) as serial columns were used. Tetrahydrofuran was employed as a solvent for GPC to measure the molecular weight of the polymer with a flux of 0.3 ml/min at 41° C. for 60 minutes per sample.

Samples for measurement of mechanical properties were fabricated by injection molding. The measurement standards are presented in Table 2.

The type and the added amount of the individual ingredient in the respective steps are presented in Table 3.

TABLE 2

| Property | Standard |
| --- | --- |
| Tensile strength | ASTM D638 |
| Flexural strength | ASTM D790 |
| Impact strength | ASTM D256 |
| Hardness | ASTM D785 |
| Melt flow index | ASTM D1238 |

TABLE 3

| | | Unit: phm | |
| --- | --- | --- | --- |
| Step | Ingredient | Example 1 | Example 2 |
| (1) (L1 and S1) | cyclohexane | 370 | 370 |
| | THF | 0.036 | 0.042 |
| | S | 27 | 27 |
| | n-butyl lithium | 0.047 | 0.060 |
| (2) (B1 and S2) | cyclohexane | 10 | 10 |
| | B | 8 | 8 |
| | S | 9 | 8 |
| (3) (L2 and S3) | cyclohexane | 10 | 10 |
| | n-butyl lithium | 0.033 | 0.029 |
| | S | 20 | 15 |
| (4) (B2) | cyclohexane | 5 | 5 |
| | B | 17 | 17 |
| (5) (S4) | cyclohexane | 5 | 5 |
| | S | 19 | 25 |

In Table 3, the symbol "(L and S)" represents the addition of the initiator and styrene, and the symbol "(B and S)" represents the addition of 1,3-butadiene and styrene. The symbol "phm" represents the part by weight of a specific ingredient based on 100 parts by weight of all monomers.

As illustrated in Table 3, the products were prepared by addition of two charges of styrene and the initiator and polymerization (steps (1) and (3)) and addition of one charge of 1,3-butadiene and styrene and polymerization (step (2)) in Examples 1 and 2.

Thus a polymer having one tapered block in the middle of the chain only at the high molecular weight copolymer was obtained. Namely, the product was a bimodal composition of a hexa-block copolymer having one tapered block and a tri-block copolymer without a tapered block. More specifically, the chain structure of the bimodal block copolymer thus obtained was a bimodal mixture composed of a hexa-block copolymer of vinyl aromatic block(PS1)-conjugated diene block(PB1)-tapered block(T)-vinyl aromatic block(PS2–PS3)-conjugated diene block (PB2)-vinyl aromatic block (PS4), and a tri-block copolymer of vinyl aromatic block(PS3)-conjugated diene block(PB2)-vinyl aromatic block(PS4). The content of the hexa-block copolymer in the bimodal linear copolymer was 72% in Example 1 and 77% in Example 2, respectively.

The molecular weight of the hexa-block copolymer and the tri-block copolymer obtained in the respective examples were analyzed by GPC.

COMPARATIVE EXAMPLE 1

A block copolymer having one tapered block in the middle of the polymer chain was prepared from styrene and butadiene by one charge of an initiator. Namely, the preparation method of the block copolymer was performed in three steps: (1) adding styrene and n-butyl lithium, (2) adding butadiene and styrene and (3) adding styrene. The type and the added amount of the individual ingredient in the respective steps are presented in Table 4.

TABLE 4

| Step | Ingredient(unit: Phm) | |
|---|---|---|
| (1) (L and S1) | Cyclohexane | 385 |
| | THF | 0.18 |
| | S | 30 |
| | n-butyl lithium | 0.064 |
| (2) (B and S2) | Cyclohexane | 10 |
| | B | 25 |
| | S | 15 |
| (3) (S3) | Cyclohexane | 5 |
| | S | 30 |

In Table 4, the symbol "(L and S)" represents the addition of the initiator and styrene and the symbol "(B and S)" represents the addition of 1,3-butadiene and styrene. The symbol "phm" represents the part by weight of a specific ingredient based on 100 parts by weight of all monomers.

The block copolymer chain thus obtained has a tetra-block structure of vinyl aromatic block(PS1)-conjugated diene block(PB)-tapered block(T)-vinyl aromatic block (PS2–PS3), i.e., a monomodal structure of (PS1)-(PB)-(T)-(PS2–PS3), which was analyzed by GPC.

COMPARATIVE EXAMPLE 2

A block copolymer having one tapered block at the end of the polymer chain was prepared from styrene and butadiene by three charges of an initiator. Namely, the preparation method of the block copolymer was performed in five steps: (1) adding n-butyl lithium and styrene, (2) adding n-butyl lithium and styrene, (3) adding butadiene, (4) further adding n-butyl lithium and styrene, and (5) adding butadiene and styrene. The type and the added amount of the individual ingredient in the respective steps are presented in Table 5.

TABLE 5

| Step | Ingredient(unit: Phm) | |
|---|---|---|
| (1) (L and S1) | cyclohexane | 365 |
| | THF | 0.05 |
| | S | 32 |
| | n-butyl lithium | 0.03 |
| (2) (B and S2) | cyclohexane | 10 |
| | B | 0.025 |
| | S | 13 |
| (3) (S3) | cyclohexane | 5 |
| | S | 6 |
| (4) (L3 and S3) | cyclohexane | 10 |
| | L | 0.03 |
| | S | 15 |
| (5) (B2 and S3) | cyclohexane | 10 |
| | B | 19 |
| | S | 15 |

In Table 5, the symbol "(L and S)" represents the addition of the initiator and styrene and the symbol "(B and S)" represents the addition of 1,3-butadiene and styrene. The symbol "phm" represents the part by weight of a specific ingredient based on 100 parts by weight of all monomers.

The block copolymer chain thus obtained has a trimodal composition composed of a hexa-block copolymer of vinyl aromatic block(PS1–PS2)-conjugated diene block (PB1)-vinyl aromatic block(PS3)-conjugated diene block(PB2)-tapered block(T)-vinyl aromatic block(PS4); a hexa-block copolymer of vinyl aromatic block(PS2)-conjugated diene block(PB1)-vinyl aromatic block(PS3)-conjugated diene block(PB2)-tapered block (T)-vinyl aromatic block(PS4); and a tetra-block copolymer of vinyl aromatic block(PS3)-conjugated diene block(PB2)-tapered block(T)-vinyl aromatic block (PS4), i.e., two hexa-block copolymers of (PS1–PS2)-(PB1)-(PS3)-(PB2)-(T)-(PS4) and (PS2)-(PB1)-(PS3)-(PB2)-(T)-(PS4) and one tetra-block copolymer of (PS3)-(PB2)-(T)-(PS4). This was analyzed by GPC.

EXPERIMENTAL EXAMPLE

This example compares the properties of the bimodal linear copolymer resin according to the present invention with those of the monomodal linear copolymer resin having one tapered block in the middle of the polymer chain and the trimodal linear copolymer having one tapered block at the end of the polymer chain according to the comparative examples.

The bimodal linear copolymer resins of the present invention were prepared according to Examples 1 and 2, and the comparative copolymer resins were prepared according to Comparative Examples 1 and 2. The comparison data of properties are presented in Table 6.

TABLE 6

| | Example | | Comparative Example | |
|---|---|---|---|---|
| Property | 1 | 2 | 1 | 2 |
| Melt flow index (200° C., 5 kg) | 3 | 6 | 1 | 10 |
| Tensile strength ($kg_f/cm^2$) | 284 | 205 | 246 | 260 |
| Tensile elongation (%) | 370 | 263 | 326 | 185 |
| Flexural strength ($kg_f/cm^2$) | 305 | 298 | 232 | 280 |
| Flexural modulus ($kg_f/cm^2 \times 10^{-3}$) | 12 | 12 | 9 | 12 |
| Hardness, Shore D | 68 | 71 | 65 | 67 |
| Impact strength ($kJ/m^2$) | 4.1 | 4.0 | 2.4 | 2.6 |
| Mw × $10^{-3}$ | 118 | 112 | 142 | 112 |
| Dispersity | Bimodal | | Monomodal | Trimodal |

As can be seen from Table 6, the bimodal linear block copolymers obtained according to the present invention are excellent in rigidity, toughness and flexibility with general properties balanced. But the monomodal block copolymer of Comparative Example 1 is inferior in strength and toughness and the trimodal block copolymer is inferior in flexibility. Namely, the bimodal linear block copolymers of the present invention is readily prepared by a simple method as Comparative Example 1, overcoming the limitation in property of the monomodal block copolymer, and acquires more balanced and excellent properties than the trimodal block copolymer of Comparative Example 2 without using a complex preparation method.

As described above, the block copolymer resin of the present invention can be easily controlled in regard to the composition of high molecular weight and low molecular weight copolymers whenever needed and thereby designed with variable mechanical properties such as strength, flexibility, toughness and rigidity. In addition, the block copolymer resin of the present invention readily acquires diversity of properties by varying the molecular weight and the content of the polyvinyl aromatic block and balance of different properties by simplifying its preparation method.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A bimodal linear block copolymer comprising a hexa-block copolymer of vinyl aromatic block-conjugated diene block-tapered block-vinyl aromatic block-conjugated diene block-vinyl aromatic block, and a tri-block copolymer of vinyl aromatic block-conjugated diene block-vinyl aromatic block, wherein the bimodal linear block copolymer containing a tapered block and comprising 55 to 95 wt. % of at least one vinyl aromatic monomer having 8 to 12 carbon atoms and 5 to 45 wt. % of at least one conjugated diene monomer having 4 to 6 carbon atoms.

2. The bimodal linear block copolymer as claimed in claim 1, the bimodal linear block copolymer comprises 30 to 90 wt. % of the hexa-block copolymer and 70 to 10 wt. % of the tri-block copolymer.

3. The bimodal linear block copolymer as claimed in claim 1, the bimodal linear block copolymer comprises 70 to 80 wt % of the vinyl aromatic monomer and 30 to 20 wt. % of the conjugated diene monomer.

4. The bimodal linear block copolymer as claimed in claim 1, the conjugated diene monomer includes at least one selected from 1,3 butadiene and isoprene; and the vinyl aromatic monomer is at least one selected from the group consisting of styrene, p-methylstyrene, o-methylstyrene and α-methylstyrene.

5. A method for preparing a bimodal linear block copolymer, comprising:
   (1) adding an initiator and a vinyl aromatic monomer to form a polyvinyl aromatic living polymer chain;
   (2) adding both a conjugated diene monomer and a vinyl aromatic monomer to the polyvinyl aromatic living polymer chain to form a living polymer chain of vinyl aromatic block-conjugated diene block-tapered block-vinyl aromatic block;
   (3) further adding an initiator and a vinyl aromatic monomer to the living polymer chain obtained in the step (2) to continuously grow a vinyl aromatic block of vinyl aromatic block-conjugated diene block-tapered block-vinyl aromatic block and form another living polymer of vinyl aromatic block;
   (4) adding a conjugated diene monomer to the product of the step (3) to form a living polymer of vinyl aromatic block-conjugated diene block-tapered block-vinyl aromatic block-conjugated diene block and living polymer of vinyl aromatic block-conjugated diene block;
   (5) adding a vinyl aromatic monomer to the product of the step (4) to form a living polymer of vinyl aromatic block-conjugated diene block-tapered block-vinyl aromatic block-conjugated diene block-vinyl aromatic block and a living polymer of vinyl aromatic block-conjugated diene block-vinyl aromatic block; and
   (6) adding a polymerization terminator to terminate polymerization and performing polymer isolation to prepare a bimodal linear block copolymer comprising a hexa-block copolymer of vinyl aromatic block-conjugated diene block-tapered block-vinyl aromatic block-conjugated diene block-vinyl aromatic block and a tri-block copolymer of vinyl aromatic block-conjugated diene block-vinyl aromatic block,
   wherein the bimodal linear block copolymer containing a tapered block and comprising 55 to 95 wt. % of at least one vinyl aromatic monomer having 8 to 12 carbon atoms and 5 to 45 wt. % of at least one conjugated diene monomer having 4 to 6 carbon atoms.

6. The method as claimed in claim 5, wherein the monomers and the initiator are added in each step in the following ranges of addition:

| Step | Ingredient | range (unit: phm) |
|---|---|---|
| (1) | Initiator | 0.013~0.192 |
|  | Vinyl aromatic monomer | 20~30 |
| (2) | Conjugated diene monomer | 2.5~15 |
|  | Vinyl aromatic monomer | 5~20 |
| (3) | Initiator | 0.001~0.075 |
|  | Vinyl aromatic monomer | 15~20 |
| (4) | Conjugated diene monomer | 2.5~30 |
| (5) | Vinyl aromatic monomer | 15~25 |
| Total content of vinyl aromatic monomer | | 55~95 |
| Total content of conjugated diene monomer | | 45~5 |
| Total content of initiator | | 0.014~0.267. |

7. The method as claimed in claim 5, the monomers and the initiator are added in each step in the following ranges of addition:

| Step | Ingredient | range (unit: phm) |
|---|---|---|
| (1) | Initiator | 0.023~0.096 |
|  | Vinyl aromatic monomer | 25~30 |
| (2) | Conjugated diene monomer | 5~10 |
|  | Vinyl aromatic monomer | 5~15 |
| (3) | Initiator | 0.001~0.064 |
|  | Vinyl aromatic monomer | 15~20 |
| (4) | Conjugated diene monomer | 15~20 |
| (5) | Vinyl aromatic monomer | 25~15 |
| Total content of vinyl aromatic monomer | | 70~80 |
| Total content of conjugated diene monomer | | 30~20 |
| Total content of initiator | | 0.024~0.160. |

8. The method as claimed in claim 5, the polymerization terminator is water and carbon dioxide.

9. The method as claimed in claim 5, the method for preparing a bimodal linear block copolymer is performed in an inert hydrocarbon solvent in the temperature range of −10 to 150° C. with oxygen and water eliminated, the method further comprising:
   adding a stabilizer after adding a polymerization terminator to terminate the polymerization; and
   removing the remaining inert hydrocarbon solvent.

10. The method as claimed in claim 9, the inert hydrocarbon solvent is at least one selected from the group consisting of cyclohexane, cyclopentane, n-hexane and n-heptane; the polymerization terminator being water and carbon dioxide; and the stabilizer being a mixture of hindered phenol and organophosphite.

11. The method as claimed in claim 5, the conjugated diene monomer is at least one selected from 1,3-butadiene and isoprene; the vinyl aromatic monomer being at least one selected from the group consisting of styrene, p-methylstyrene, o-methylstyrene and α-methylstyrene; and the initiator being n-butyl lithium.

12. The method as claimed in claim 5, further a tetrahydrofuran is added in an amount of 0.01 to 1.0 phm before or during the polymerization reaction.

13. The method as claimed in claim 5, the vinyl aromatic block formed in the step (2) to the vinyl aromatic block formed in the step (3) have a ratio of the block is 10–0.1.

14. The method as claimed in claim 5, the bimodal linear block copolymer comprises 30 to 90 wt. % of the hexa-block copolymer and 10 to 70 wt. % of the tri-block copolymer.

15. A bubble pack manufactured from the copolymer according to claim 1.

16. A bubble pack manufactured from a copolymer prepared by the method according to claim 5.

* * * * *